READING AND CONVEYING APPARATUS FOR RECORDING MEDIUMS AS ENVELOPES AND POSTCARDS

Filed Jan. 30, 1968 4 Sheets-Sheet 1

INVENTORS
SEINOSUKE KAJITAN
KIMIAKI NORO
YOSHIYUKI MIZUNUMA
SOU KAMIMURA
SHUNICHT NAKAJIMA

BY Stephen H. Frishauf
Atty

United States Patent Office 3,511,368

Patented May 12, 1970

3,511,368

READING AND CONVEYING APPARATUS FOR RECORDING MEDIUMS AS ENVELOPES AND POSTCARDS

Seinosuke Kajitani, Kimiaki Noro, and Yoshiyuki Mizunuma, Yokohama-shi, Sou Kamimura, Kawasaki-shi, and Kazuyuki Kawasaki and Shunichi Nakajima, Yokohama-shi, Japan, assignors to Tokyo Shibaura Electric Co., Ltd., Kawasaki-shi, Japan, a corporation of Japan Filed Jan. 30, 1968, Ser. No. 701,746

Claims priority, application Japan, Feb. 4, 1967, 42/7,124; Mar. 20, 1967, 42/17,240, 42/22,954; Sept. 9, 1967, 42/76,850

Int. Cl. B07c *3/14*

U.S. Cl. 209—73 9 Claims

ABSTRACT OF THE DISCLOSURE

A plurality of stacked written mediums are successively paid out one after the other from the front end of the stock. An information item is read on the foremost written medium while it is held stationary before it is paid out and a conveyor conveys the written medium along a predetermined path according to the read out information.

This invention relates to a reading and conveying apparatus for written mediums and more particularly to successively read out a plurality of stacked recording mediums such as letters or post cards and to classify them according to the information contained therein.

With recent rapid increase in the volume of postal matters the operation of classifying postal matters according to their addresses is performed automatically. For example, addresses of postal matters are identified by particular information such as numbers, codes or marks and an automatic classifying machine has been proposed in which said number or marks are read by a photo-electric conveyer whereby to convey read out postal matters to predetermined paths. There are two types of such reading system, in one system postal matters are read while they are moving and in the other system during conveyance postal matters are stopped for reading their addresses. While the former has a higher classifying speed than the latter, there is a tendency of causing erroneous reading because address identifying numbers of marks are read during movement of postal matters. On the other hand the advantages or defects of the latter system are opposite to those of the former system. Accordingly, from the standpoint of decreasing erroneous readings the latter is superior. With the latter system, however, since postal matters are required to be stopped for reading after they have been successively sent out from a stack, there are such defects as lowering the speed of reading and increasing the size, and the cost of installing of the machine.

Accordingly, an object of this invention is to provide a reading and conveying apparatus capable of performing rapid and exact reading of written mediums.

A further object of this invention is to provide an improved readng and conveying apparatus which is much more compact than conventional apparatus.

According to this invention, to attain these and other objects, there is provided means for reading a plurality of laminated written mediums while they are stationary prior to the initiation of their successive movements. Generally, when written mediums are brought to a position where they are laminated, each of them momentarily assumes a stationary state. This invention effectively utilises such a stationary period of the written mediums for reading so as to reduce the time required for reading.

As the reading operation is preferred while the written mediums are held stationary the result of the reading is accurate. Moreover, as it is not necessary to provide any apparatus for momentarily stopping the movement of the written mediums the apparatus as a whole can be made more compact.

The foregoing objects and other objects as well as characteristic features of the invention will become more apparent and readily understandable from the following description when taken in conjunction with the accompanying drawings, in which.

Figures 1, 2:
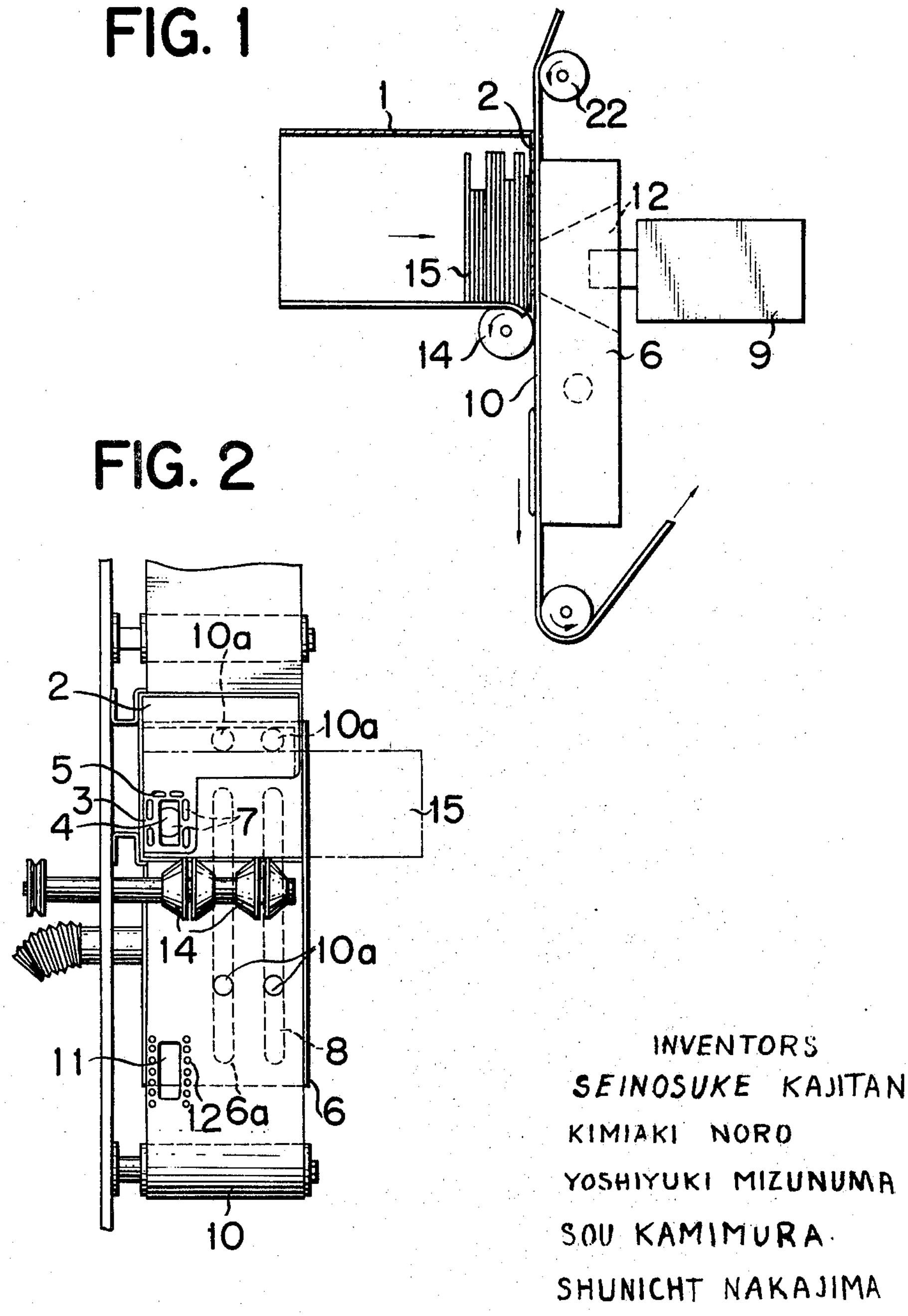
FIG. 1 shows a side view, partly broken away, of a reading device and components associated therewith utilized in one embodiment of this invention.
FIG. 2 is a front view of the components shown in FIG. 1.

Referring now to the accompanying drawings, there is provided a written medium supply device 1 containing a plurality of written mediums 15, such as postal matters, in a laminated (or horizontally stacked) state. The supply device is shaped in the form of a rectangular box with a front panel 2 at its fore end. As shown in FIG. 2, the front panel 2 has generally a letter L configuration having an integral projection 3 at one edge, said projection being formed with a central window 4 through which reading operation is performed and a plurality of slits 5 around the window 4. A suction device 6 is provided in front of the front panel 2 to take out the written mediums, one at a time, which is operated by a vacuum pump, not shown, to attract successive written mediums. The attracting surface of the suction device 6 is provided with a suction port 7 at a position to face the window 4 and slits 5 of the front panel 2, and elongated longitudinal suction slots 8 on one side of the suction port 7. In front of the suction device 6 is provided a reading device 9 at a position to oppose the written medium supply device 1 to read out the marks on the written mediums while they are held stationary at the front end of the supply device 1 prior to their being taken out. Further, between the front panel 2 and the suction device 6 is provided a conveying device shown as a conveyor belt 10 adapted to convey the written mediums along a predetermined path after they have been read out. The conveyor belt 10 is formed with a window 11 and a plurality of slits 12 which are brought to align respectively with the window 4 and the slits 5 of the front panel 2 by the movement of the belt. Beside the window 11 and slits 12 is formed openings **10*a* adapted to be communicated with the elongated suction slots 8. As best shown in FIG. 1, the conveyor belt 10 is arranged to move between the front panel 2 and the suction surface of the suction device in intimate contact therewith. At the exit end of the supply device 1 are mounted rollers 14 rotated in a direction opposite to that of the movement of the conveyor belt 10** substantially in contact therewith to prevent more than one written medium from being paid out at a time.

When a lamination (or stack) of a plurality of written medium is fed into the supply device, the foremost written medium 15 will be urged against front panel 2. Under this condition when the conveyor belt 10 is moved to align its window 11 as well as slits 12 with the suction port 7 of the suction device 6 and with the window 4 and slits 5 of the front panel 2 respectively, the suction device 6 will attract the written medium 15 against the front panel 2 whereby its information or address or the like is read out by the reading device 9. Upon completion of the reading operation of the written medium the openings 10*a* of the conveyor belt 10 are brought to the position to communicate with elongated suction slot 8 of the suction device 6 thus attracting the written medium 5 against one side of the conveyor belt 10 to convey the written medium 5 to a predetermined position along with the conveyor belt 10.

Figure 3:
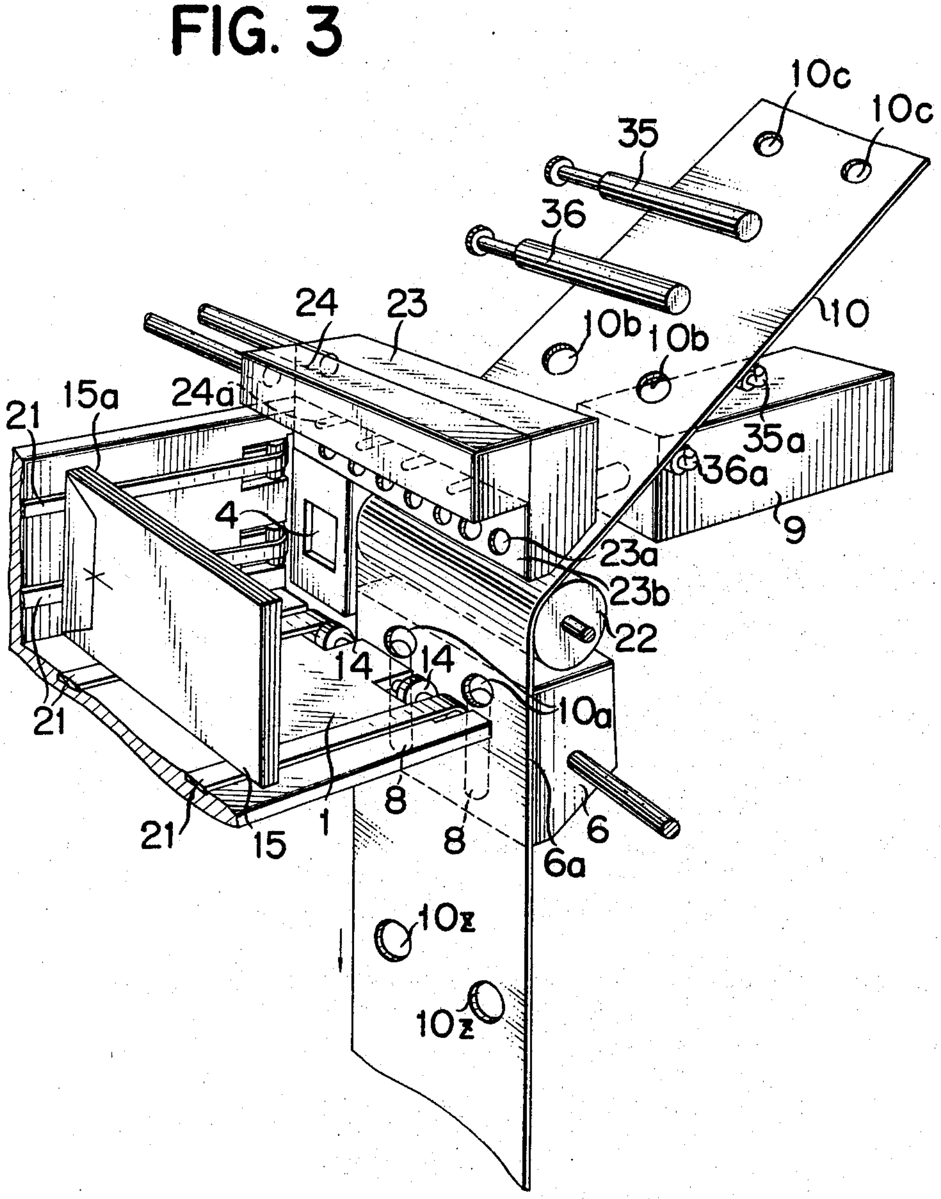
FIG. 3 shows a perspective view of a reading device and components associated therewith utilised in another embodiment of this invention.
Figure 4:
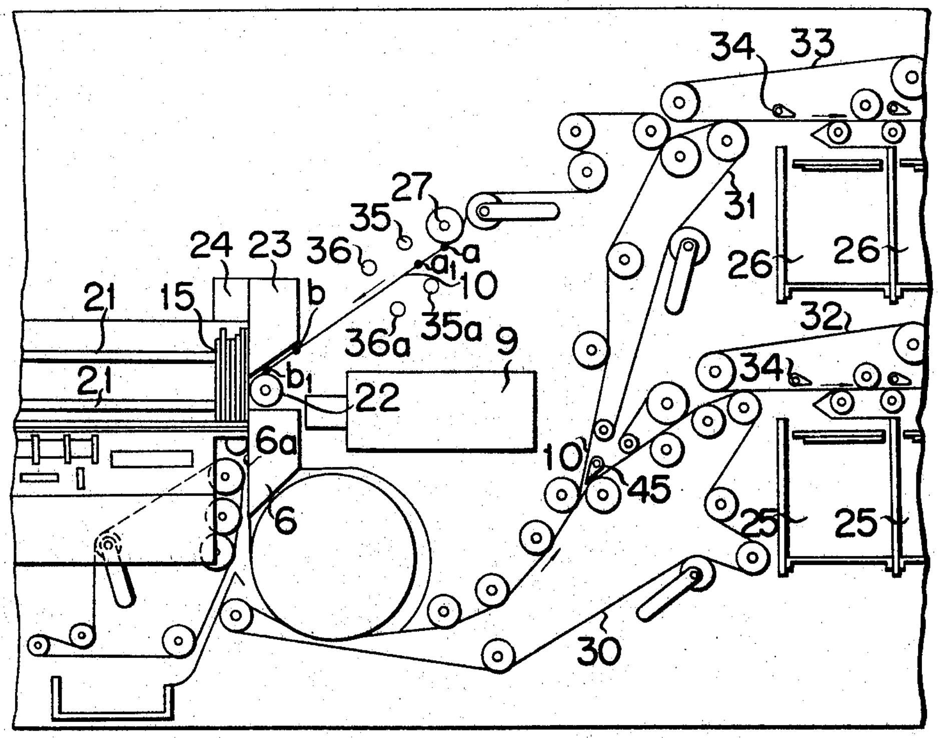
FIG. 4 is a diagrammatic side view of the whole reading and conveying apparatus for written mediums which employs the apparatus illustrated in FIG. 3.

FIGS. 3 and 4 illustrate another embodiment of this invention. The apparatus shown in these figures is an improvement of the apparatus shown in FIGS. 1 and 2 and comprises means for preventing the written medium from being conveyed prior to its being read and means for preventing two or more of a plurality of laminated (or stacked) written mediums from being conveyed at a time. Components of FIGS. 3 and 4 are designated by the same reference numerals as in FIGS. 1 and 2. As shown in FIG. 3 a plurality of written mediums 15 such as envelopes or post cards are mounted vertically on an L shaped supply device 1 and are disposed therein to be successively advanced by means of rotary belts 21. To convey the written mediums there is provided a conveyor mechanism including a roller 22 adapted to drive a conveyor belt 10 in the longitudinal direction, said belt 10 having equally spaced openings 10*a*, 10*b*, 10*c* . . . . A window 4 is provided adjacent one side of the conveyor belt 10. Further a photoelectric reading device 9 is mounted adjacent the rear side of the conveyor belt to instantly read out numbers or marks on the written mediums 15 when they are urged against the window 4 and held stationary. Beneath the roller 22 is situated a suction device 6 connected to a vacuum pump (not shown), said suction device being formed with elongated suction slots 8 on its front surface. The upper ends of these slots 8 are positioned at a level slightly above the bottom plate of the supply device 1. As a result when the openings 10*a* of the conveyor belt 10 are brought to align with the elongated slots 8 of the suction device 6 the lower edge of the foremost written medium 15 will be attracted against the conveyor belt 10. In this manner, written mediums 15 are successively conveyed one at a time to gates to be described later by the action of respective openings 10*a*, 10*b*, 10*c* . . . . The rollers 1 positioned near the exit end of the supply device 1 prevents the written mediums 15 from being paid out in overlapped condition. As described hereinabove, rollers 14 are rotated in a direction opposite to the direction of movement of the conveyor belt whereby pay out of a plurality of written mediums at a time is positively prevented by the friction of the rollers. Above the suction device 6 are provided a second suction device 23 and an air ejecting device 24 to cooperate with the upper surface of the conveyor belt 10. The casing of the suction device 23 is connected to a suitable vacuum pump (not shown) and the front surface thereof is provided with a number of air suction ports 23*a* along its lower edge to attract the upper edge of the foremost written medium 15*a* in the condition of payout. The casing of the air ejecting device 24 is connected to a suitable air blower (not shown) and its lower surface is formed with a number of air ejecting openings 24*a* to direct air toward the upper edge of the written medium 15.

As shown in FIG. 4, the conveyor belt 10 passes around a plurality of rollers 27 and a portion of the belt passes in contact with the suction surface of the suction device 6 around roller 22 positioned between suction devices 6 and 23. Endless belts 30 and 31 are disposed to run in contact with one side of the conveyor belt 10 and other endless belts 32 and 33 are disposed to extend horizontally respectively from parting points between belts 10 and 30 and between 10 and 31. A plurality of accumulators or receiving boxes 25 and 26 are provided beneath belts 32 and 33 and gates 34 are provided at the openings of boxes 25 and 26 to direct written mediums 15 into these boxes. The reading device 9 is electrically connected to respective gates 34 and also to a first detector 35 and a second detector 36 provided along the path to the travel of the conveyor belts 10. These detectors 35 and 36 may be comprised by photoconductive elements, for example, and light sources 35*a* and 36*a* are positioned adjacent the opposite side of the belt conveyor 10 to oppose detectors 35 and 36 respectively. The first detector 35 is connected to an electric source for driving the conveyor belt 10 so that the detector 35 is operated only when the driving device of belt 10 is energised from the source to detect passage of openings 10*a* to apply a reading operation initiating signal to the reading device 9. On the other hand the second detector 36 is connected to be operated only when the source for driving the conveyor belt is disconnected. Further, the second detector 36 is interlocked with a braking device (not shown) of the conveyor belt to stop it at a predetermined position.

When one set of the openings of the conveyor belt 10, for example the opening 10*c*, assumes a position in front of the first detector 35 or a point *a* as shown in FIG. 4, the adjacent openings 10*b* will be at a point *b*. When the belt driving device is energised under this condition, conveyor belts 10 and endless belts 30 and 31 in contact therewith will be rotated simultaneously in the direction shown by respective arrows. Simultaneously therewith the first detector 35 is also operated. As the conveyor belt 10 is moved the openings 10*c* will be moved from point *a* to a position between the first detector 35 and its associated light source 35*a* or a point $a_1$ to permit light emitted from the light source 35*a* to impinge upon the first detector 35 through openings 10*c*. Thus, the first detector 35 responds to the incident light to generate an electric signal which is supplied to the reading device 9 as the reading operation initiating signal, thus initiating the operation of the reading device 9. At the same time the openings 10*b* are moved from point *b* to point $b_1$ or to a position in front of the supply device by the movement of the conveyor belt 10. Just prior to an instant when the openings 10*b* come to align with the elongated slots 8 of the suction device 6, the mark representing the address or the like of the foremost written medium 15*a* in the supply device will be read out by the reading device 9 which has been set into operation beforehand. Although the reading device 9 performs the reading operation in a moment, after completion of the reading operation, when the openings 10*b* are moved from point $b_1$ to the suction face 6*a* of the suction device 6 which is operating continuously, the written medium 15*a* which has been read out will be attracted against the conveyor belt 10 through opening 10*b*. When the attracted written medium 15 is removed from the suction surface 6*a* by the movement of the conveyor belt it will drop along the belt 10 and will then be caught between cooperating belts 10 and 30 to be conveyed further. By the selective operation of a gate 45 the written medium 15 is sent to either the endless belt 32 or 33. As the signal generated by the reading device 9 is applied to an appropriate one of the gates 34 the written mediums will be classified and collected in respective receiving boxes 25 and 26.

In this manner, a plurality of written mediums 15 contained in the supply device 1 are successively read out by the reading device 9, conveyed by means of conveyor belts 10, 30, 31, 32 and 33 and are classified in respective receiving boxes 25 and 26.

After completion of the reading and classifying operation of the written mediums contained in the supply device 1, the belt driving device is deenergised. Then the second detector will be started to operate. When the openings 10*c* of the conveyor belt 10 are brought to a position facing the second detector 36 by the inertia of the conveyor belt 10, the light emanated from the light source $36a$ impinges upon the second detector through openings $10c$. In response to this light, the second detector 36 will supply an electrical signal to the braking device (not shown) to stop the belt 10. However, due to the inertia of the conveyor belt 10 which has been moved at a high speed, openings $10c$ will stop near point *b* beyond the second detector 36.

Then the next adjacent openings $10d$ (not shown) will stop near point *a* behind the first detector 35. This is to prevent a written medium $15a$ not read out by the reading device 9 from being conveyed by the conveyor belt 10, which may occur when the belt is restarted to bring certain leading openings (for example $10b$) to a position of communication with elongated slots 8 of the suction device 6 before trailing openings (for exauple $10c$) are not yet brought to the first detector 35. With the machine having the above described construction, the foremost written medium $15a$ contained in the supply device 1 is attracted by the suction port $23a$ of the suction device 23 and by the elongated slots 8 of the suction device 6 and after the read out operation has been made is paid out one after another. However, written mediums 15 other than the foremost one $15a$ are separated from the foremost written medium by the action of rollers 14 and air ejected from openings $24a$ so that there is no tendency of the foremost written medium $15a$ to be paid out together with other written mediums.

Figures 5, 6:
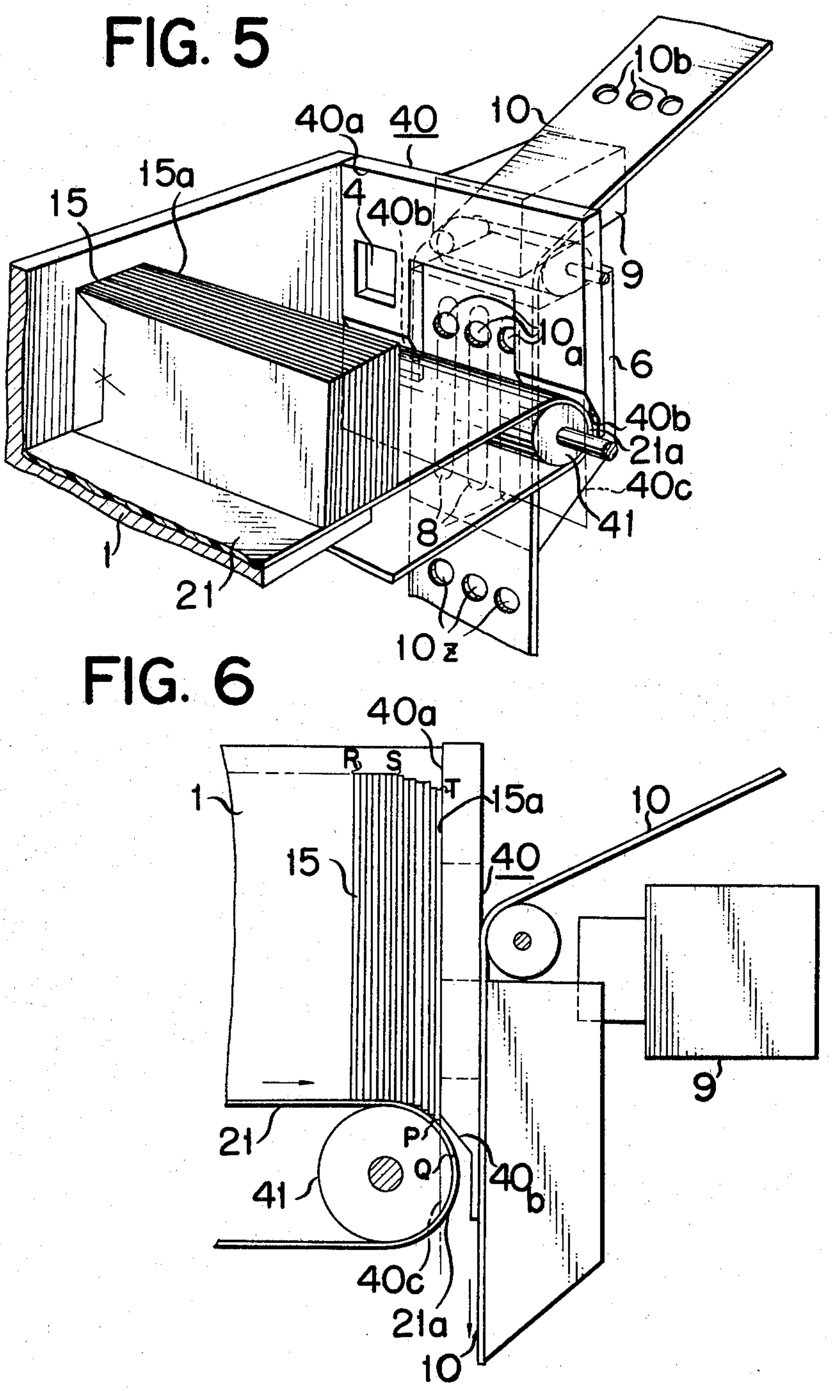
FIG. 5 is a perspective view of a reading device and components associated therewith illustrating a still further embodiment of this invention.
FIG. 6 is a side view of the apparatus shown in FIG. 5.

FIGS. 5 and 6 illustrate another embodiment of this invention wherein components identical to those shown in FIG. 1 are designated by the same reference numerals so that their description is unnecessary. In this embodiment, the supply device 1 is provided with a guide plate 40 having flat surface $40a$ adapted to abut the foremost written medium $15a$ and a curved recess $40b$. A conveyor belt 21 passing around a pulley 41 is arranged to run close to the surface of the curved recess $40b$ as shown by a reference numeral $21a$. Namely, the curved recess $21a$ of the conveyor belt 21 has its front part disposed between the curved recess $40b$ of the guide plate 40 and the supposed extension of the flat surface $40a$ of said guide plate in such a manner that the front part is kept at the prescribed distance from the curved recess $40b$. For this reason, when a plurality of upright written mediums 15 are advanced by the belt 21 in the direction indicated by an arrow, the foremost written medium $15a$ is urged against the flat surface $40a$ of the guide plate 40 while standing on the belt 21 at point P, and the curve R-S-T interconnecting the upper edges of the written mediums 15 can be kept in a substantially horizontal position regardless of the thickness of the written mediums. If the axis of the pulley 41 were positioned on the extension $40c$ of the flat surface 40 the curve R-S-T would become a straight line. In any case, a window 4 is provided at a position to positively read out marks on the written medium.

Without the guide plate 40 the lower edge of the foremost written medium would stand on the curved portion $21a$ of the belt 21 at a point Q which is close to the innermost end of the belt 21 thus causing the foremost written medium $15a$ to slip down before it is read out. Since the foremost written medium can be held more stably at point P than at point Q it can be read out more accurately and the tendency of falilng down of thin written mediums such as post cards through a gap between the curved portion $21a$ of the belt and the curved recess $40b$ can be precluded.

While in the foregoing, the invention has been described with reference to preferred embodiments, it will be obvious to those skilled in the art that various changes and modifications may be made therein without departure from the true spirit and scope of the invention.

What is claimed is:

1. A reading and conveying apparatus for written mediums comprising:

a written medium supply device having an exit port to supply a stack of written mediums;

means to successively pay out each of said written mediums in said stack;

a reading device to read an information item on the foremost written medium in said stack while it is held stationary before pay out; and a conveyor to convey said read out and paid out written medium along a predetermined path corresponding to said read out information;

said pay out means including:

a suction device having at least one suction opening facing said exit port; and a conveyor belt having at least one suction opening therein and which is passed between said supply device and said suction device;

said suction opening of said suction device being normally blocked by said conveyor belt to maintain said written mediums in said stationary condition so that said information on said written mediums may be read out by said reading device, and said suction opening of said suction device communicating with and attracting said written medium when said suction openings of said suction device and of said conveyor belt are in registration, thereby attracting one of said written mediums against said conveyor belt, said written medium that has been read out being withdrawn from said supply device as said conveyor belt is moved.

2. A reading and conveying apparatus according to claim 1, wherein said suction device is provided with at least one elongated suction opening.

3. A reading and conveying apparatus according to claim 1, wherein said conveyor belt has a plurality of suction openings spaced in the longitudinal direction of said belt.

4. A reading and conveying apparatus according to claim 1 wherein said conveyor belt is provided with at least one read out window for reading said written mediums, said read out window being distinct from said suction opening, whereby the information on the foremost written medium contained in said supply device is read out by said reading device through said window while said foremost written medium is held stationary and before said suction opening of said belt is brought to communicate with said opening of said suction device in front of said foremost written medium.

5. A reading and conveying apparatus according to claim 1 wherein a roller driven in a direction opposite to that of the movement of said conveyor belt is provided proximate the exit port of said supply device, through which said recording mediums are paid out.

6. A reading and conveying device according to claim 1 wherein said suction device includes at least one suction port to directly attract the upper edge of the foremost written medium contained in said supply device and wherein an air ejecting device is provided proximate the upper portion of said written mediums so as to separate the foremost written medium from remaining written mediums.

7. A reading and conveying device according to claim 1 further comprising:

an electric source adapted to operate said reading device and said conveyor belt;

a braking device for said conveyor belt;

a first and a second detector, said first detector detecting said at least one suction opening of said conveyor belt when it is brought to a position facing said first detector to supply a reading operation initiating signal to said reading means, and said second detector detecting the passage of said at least one suction opening of said conveyor belt and to send a stopping signal to said braking device to stop said conveyor belt at a position at which said suction openings are in registration to attract and convey the foremost written medium in the supply device after its information is read.

8. A reading and conveying apparatus according to claim 7 wherein said first and second detectors comprise a stationary light source adjacent one side of said conveyor belt and photoelectric units adjacent the other side of said conveyor belt to respond to light rays passing through said at least one suction opening of said conveyor belt to generate said signals.

9. A reading and conveying apparatus for written mediums comprising:
- a written medium supply device having an exit port to supply a stack of written mediums;
- means to successively pay out each of said written mediums in said stack;
- a reading device to read an information item on the foremost written medium in said stack while it is held stationary before pay out; and
- a conveyor to convey said read out and paid out written medium along a predetermined path corresponding to said read out information;
- said supply means including:
- a pulley;
- a feed belt wrapped around said pulley to feed written mediums in the upright state toward said pulley;

- a guide plate having a flat surface adapted to receive the foremost written medium and a recessed portion contiguous to said flat portion; and
- means to pay out said foremost written medium through a gap formed between the curved portion of said belt around said pulley and said recessed portion of said guide plate, said curved portion having its front part disposed between the recessed portion of the guide plate and the flat surface of said guide plate such that said front part of said curved portion is kept at a prescribed distance from said recessed portion.

References Cited

UNITED STATES PATENTS

| | | | |
|---|---|---|---|
| 2,977,114 | 3/1961 | Hanson | 209—72 X |
| 3,051,309 | 8/1962 | Leathers | 209—72 |

RICHARD A. SCHACHER, Primary Examiner

U.S. Cl. X.R.

250—219; 271—34